US010880610B2

(12) United States Patent
Lee et al.

(10) Patent No.: US 10,880,610 B2
(45) Date of Patent: Dec. 29, 2020

(54) METHOD FOR PROVIDING ADDITIONAL CONTENTS AT TERMINAL, AND TERMINAL USING SAME

(71) Applicant: Samsung Electronics Co., Ltd., Suwon-si (KR)

(72) Inventors: Dong-chang Lee, Suwon-si (KR); Se-won Moon, Suwon-si (KR); Jun-kyu Lee, Suwon-si (KR); Hyun-kwon Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 15/573,782

(22) PCT Filed: May 17, 2016

(86) PCT No.: PCT/KR2016/005193
§ 371 (c)(1),
(2) Date: Nov. 13, 2017

(87) PCT Pub. No.: WO2016/208877
PCT Pub. Date: Dec. 29, 2016

(65) Prior Publication Data
US 2018/0132003 A1 May 10, 2018

(30) Foreign Application Priority Data
Jun. 23, 2015 (KR) .................. 10-2015-0089093

(51) Int. Cl.
*H04N 21/4722* (2011.01)
*H04N 5/445* (2011.01)
(Continued)

(52) U.S. Cl.
CPC ....... *H04N 21/4722* (2013.01); *G06F 3/0484* (2013.01); *G06F 16/438* (2019.01);
(Continued)

(58) Field of Classification Search
CPC ............ H04N 21/4312; H04N 21/433; H04N 21/4532; H04N 21/454; H04N 21/4622;
(Continued)

(56) References Cited

U.S. PATENT DOCUMENTS 8,810,599 B1 * 8/2014 Tseng .................. G05D 1/0278
345/633
8,913,171 B2 12/2014 Roberts et al.
(Continued)

FOREIGN PATENT DOCUMENTS

CN 101883197 A 11/2010
CN 102138344 A 7/2011
(Continued)

OTHER PUBLICATIONS

Extended European Search Report for European Patent Application No. 16814590.2 dated Mar. 19, 2018; 5 pages.
(Continued)

*Primary Examiner* — Junior O Mendoza

(57) ABSTRACT

The present disclosure relates to technology for a sensor network, machine to machine (M2M) communication, machine type communication (MTC), and internet of things (IoT). The present disclosure may be applied to intelligent services (e.g., smart homes, smart buildings, smart cities, smart cars or connected cars, health care, digital education, retail, and security and safety-related services) based on the technology.

Provided are a method, an apparatus and a recording medium in which a terminal receives additional content corresponding to a captured image from a server by using a wireless communication device, and provides the additional content, based on a signal detected by a user interaction region.

15 Claims, 14 Drawing Sheets

(51) Int. Cl.
*G06F 16/438* (2019.01)
*H04N 5/232* (2006.01)
*H04W 4/70* (2018.01)
*G06F 3/0484* (2013.01)

(52) U.S. Cl.
CPC ... *H04N 5/23293* (2013.01); *H04N 5/232945* (2018.08); *H04N 5/445* (2013.01); *H04W 4/70* (2018.02)

(58) Field of Classification Search
CPC .......... H04N 21/4821; H04N 21/8549; H04N 21/8586
USPC ......... 709/203; 348/333.12, E5.024; 725/40, 725/60, 74, 135
See application file for complete search history.

(56) References Cited

U.S. PATENT DOCUMENTS

| | | | |
|---|---|---|---|
| 9,536,175 B2 | 1/2017 | Cho et al. | |
| 9,710,970 B2 | 7/2017 | Jung et al. | |
| 9,773,285 B2* | 9/2017 | Calman | G06Q 10/00 |
| 2007/0036469 A1 | 2/2007 | Kim et al. | |
| 2008/0147730 A1* | 6/2008 | Lee | G06Q 30/0212 |
| 2009/0096875 A1* | 4/2009 | Yoshimaru | H04N 5/772 |
| | | | 348/207.1 |
| 2009/0320103 A1 | 12/2009 | Veeraraghavan et al. | |
| 2010/0057924 A1* | 3/2010 | Rauber | G06Q 30/00 |
| | | | 709/229 |
| 2010/0103241 A1* | 4/2010 | Linaker | H04W 24/00 |
| | | | 348/14.02 |
| 2010/0161658 A1* | 6/2010 | Hamynen | G06F 16/9537 |
| | | | 707/770 |
| 2010/0198940 A1* | 8/2010 | Anderson | H04L 67/04 |
| | | | 709/217 |
| 2011/0043642 A1* | 2/2011 | Yu | H04N 5/23293 |
| | | | 348/207.1 |
| 2011/0169947 A1 | 7/2011 | Gum et al. | |
| 2012/0120296 A1* | 5/2012 | Roberts | H04N 21/4126 |
| | | | 348/333.12 |
| 2012/0188393 A1 | 7/2012 | Kim | |
| 2012/0188396 A1 | 7/2012 | Kim | |
| 2014/0214924 A1* | 7/2014 | Cha | H04N 21/41407 |
| | | | 709/203 |
| 2014/0333667 A1* | 11/2014 | Jung | G06T 11/00 |
| | | | 345/633 |
| 2015/0078667 A1* | 3/2015 | Yun | G06F 16/29 |
| | | | 382/195 |
| 2015/0286894 A1* | 10/2015 | Cho | G06K 9/00671 |
| | | | 382/201 |
| 2016/0086029 A1* | 3/2016 | Dubuque | G06K 9/4614 |
| | | | 382/159 |
| 2017/0331562 A1* | 11/2017 | Niewczas | H04B 11/00 |
| 2019/0089792 A1 | 3/2019 | Cha et al. | |

FOREIGN PATENT DOCUMENTS

| | | |
|---|---|---|
| CN | 102484676 A | 5/2012 |
| CN | 102714684 A | 10/2012 |
| CN | 103593793 A | 2/2014 |
| CN | 104113769 A | 10/2014 |
| CN | 105046526 A | 11/2015 |
| EP | 1553507 A2 | 7/2005 |
| EP | 1737198 A2 | 12/2006 |
| KR | 10-0696295 B1 | 3/2007 |
| KR | 10-2011-0083095 A | 7/2011 |
| KR | 10-1221540 B1 | 1/2013 |
| KR | 10-1236919 B1 | 2/2013 |
| KR | 10-1259957 B1 | 5/2013 |
| KR | 10-2013-0126532 A | 11/2013 |
| KR | 10-2014-0133640 A | 11/2014 |
| KR | 10-2014-0136510 A | 11/2014 |
| KR | 10-2015-0015944 A | 2/2015 |
| WO | 2013169080 A2 | 11/2013 |
| WO | 2014077466 A1 | 5/2014 |
| WO | 2015041872 A1 | 3/2015 |

OTHER PUBLICATIONS

Notification of the First Office Action in connection with Chinese Application No. 201680037182.7 dated Dec. 30, 2019, 17 pages.
ISA/KR, "International Search Report," Application No. PCT/KR2016/005193, dated Aug. 22, 2016, 18 pages.

* cited by examiner

METHOD FOR PROVIDING ADDITIONAL CONTENTS AT TERMINAL, AND TERMINAL USING SAME

CROSS-REFERENCE TO RELATED APPLICATIONS AND CLAIM OF PRIORITY

The present application claims priority under 35 U.S.C. § 365 and is a 371 National Stage of International Application No. PCT/KR2016/005193, filed May 17, 2016, which claims the benefit of Korean Patent Application No. 10-2015-0089093, filed Jun. 23, 2015, the disclosures of which are fully incorporated herein by reference into the present disclosure as if fully set forth herein.

TECHNICAL FIELD

The present disclosure relates to a method by which a terminal provides additional content and a terminal using the method.

BACKGROUND

The Internet has evolved from a human-centered connection network, in which humans generate and consume information, into an Internet of Things (IoT) network where information is transmitted/received between distributed elements such as objects. The Internet of Everything (IoE) that combines the IoT with big data processing through connection with a cloud server has also been developed. In order to implement the IoT, technology elements such as sensing technology, wired/wireless communication, network infrastructure, service interface technology, and security technology have been required, and thus technology such as a sensor network, machine to machine (M2M) communication, or machine type communication (MTC) for connection between objects has recently been studied.

In an IoT environment, an intelligent Internet technology (IT) service for collecting and analyzing data generated by connected objects and creating new value for human life may be provided. The IoT may be applied to smart homes, smart buildings, smart cities, smart cars or connected cars, smart grids, health care, smart appliances, advanced medical services, etc. through convergence between existing information technology (IT) technology and various industries.

SUMMARY

Provided are a method for a terminal to receive additional content corresponding to a captured image from a server by using a wireless communication device, and provide the additional content, in response to an additional content request detected by a user interaction region, a terminal using the method, and a recording medium.

A terminal for providing additional content may include: a first communication interface configured to transmit an image capturing signal to a wireless communication device within a coverage area of the wireless communication device; a second communication interface configured to receive additional content corresponding to identification information of the wireless communication device from a server that provides the additional content, according to a request of the wireless communication device based on the image capturing signal; and a processor configured to provide the additional content, in response to an additional content request for a user interaction region provided to a captured image corresponding to the image capturing signal.

A terminal may receive additional content corresponding to a captured image from a server and may provide the additional content to a user, in response to an additional content request detected by a user interaction region.

DETAILED DESCRIPTION

Figure 1:
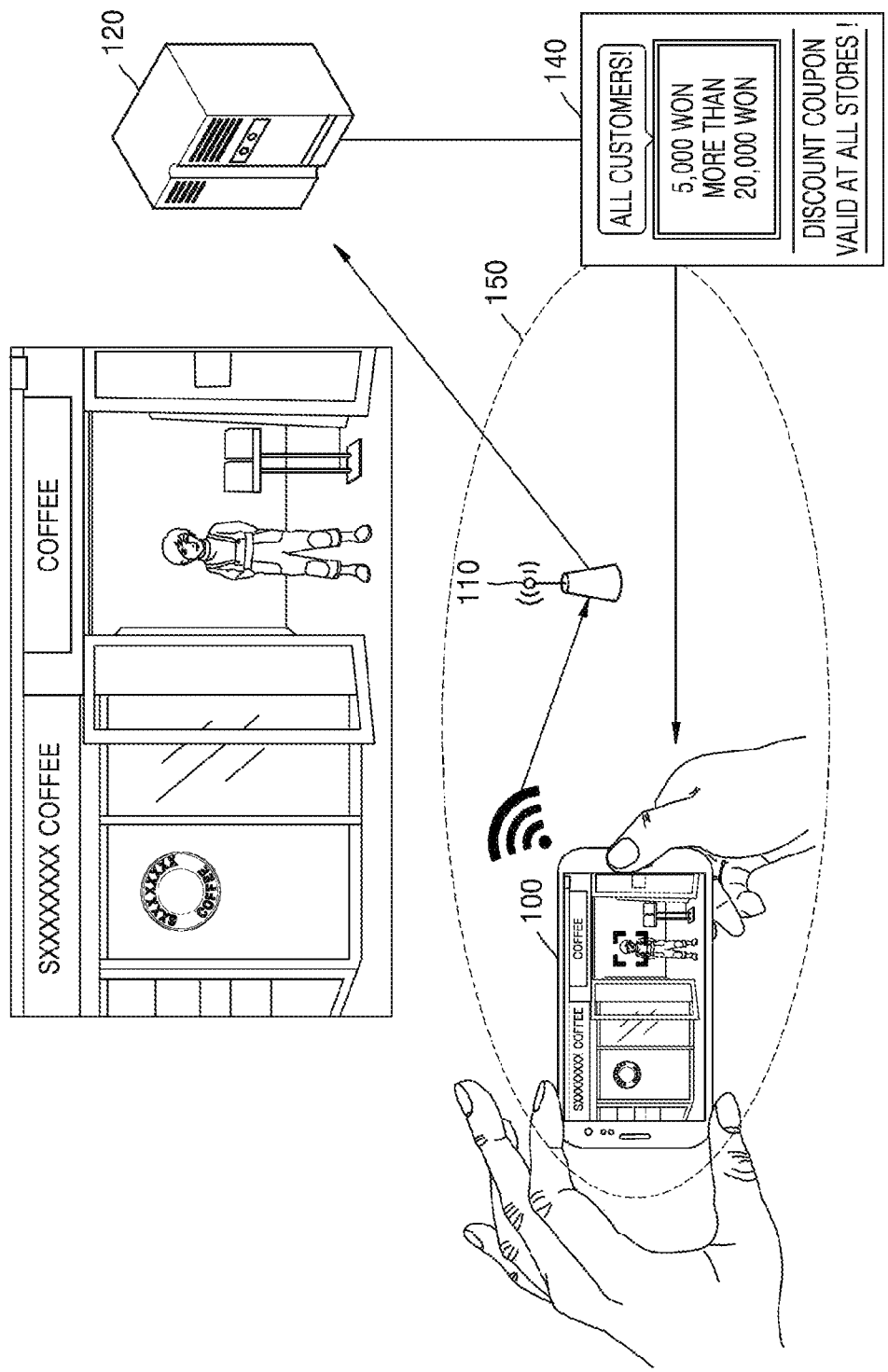
FIG. 1 is a view illustrating an example where, when additional content is a coupon, a terminal receives the additional content from a server by using a wireless communication device, according to an embodiment.

According to a first aspect, a terminal for providing additional content may include: a first communication interface configured to transmit an image capturing signal to a wireless communication device within a coverage area of the wireless communication device; a second communication interface configured to receive the additional content corresponding to identification information of the wireless communication device from a server that provides the additional content, according to a request of the wireless communication device based on the image capturing signal; and a processor configured to provide the additional content, in response to an additional content request for a user interaction region provided to a captured image corresponding to the image capturing signal.

Also, the terminal may further include a user interface configured to display the captured image and the user interaction region and allow the user interaction region to detect a signal requesting the additional content.

Also, the processor may be further configured to, before the capturing of the image, set in advance the user interaction region to a predetermined portion of a screen included in a user interface based on a user input.

Also, the terminal may further include a camera configured to capture the image, wherein the processor is further configured to set the user interaction region to an autofocus (AF) region set during the capturing of the image.

Also, the processor may be further configured to generate interactive content for providing the additional content, by linking the additional content and the user interaction region that detects the additional content request to the captured image corresponding to the image capturing signal.

Also, the processor may be further configured to change a position of the user interaction region in the captured image included in the generated interactive content based on a user input to a change position and to update the position of the user interaction region content included in the generated interactive content to the change position.

Also, the processor may be further configured to, when the additional content is a coupon and an available period of the coupon has expired, delete information about the coupon from the interactive content and provide a message indicating that the available period of the coupon has expired, and when the available period of the coupon has not expired, display the coupon.

Also, the processor may be further configured to, when a plurality of pieces of the additional content are received, provide first additional content, in response to a first additional content request for a first user interaction region from among a plurality of user interaction regions respectively corresponding to the plurality of pieces of additional content.

Also, the processor may be further configured to, when there are a plurality of the user interaction regions, provide the additional content, in response to the additional content request, detected by any one of the plurality of user interaction regions.

Also, the processor may be further configured to, after the terminal provides the additional content, delete the additional content, based on a user input detected by the user interaction region.

According to a second aspect, a method by which a terminal provides additional content may include: transmitting an image capturing signal to a wireless communication device within a coverage area of the wireless communication device; receiving the additional content corresponding to identification information of the wireless communication device from a server that provides the additional content, according to a request of the wireless communication device based on the image capturing signal; and providing the additional content, in response to an additional content request for a user interaction region provided to a captured image corresponding to the image capturing signal.

Also, the user interaction region may be an autofocus (AF) region set during the capturing of the image.

Also, before the image is captured, the user interaction region may be set in advance to a predetermined portion of a screen of the terminal based on a user input.

Also, the method may further include generating interactive content for providing the additional content, by linking the additional content and the user interaction region that detects the additional content request to the captured image corresponding to the image capturing signal, wherein the providing of the additional content includes providing the additional content by using the generated interactive content.

Also, the method may further include changing a position of the user interaction region in the captured image included in the generated interactive content based on a user input to a change position; and updating the position of the user interaction region included in the generated interactive content to the change position.

Also, the providing of the additional content may include, when the additional content is a coupon and an available period of the coupon has expired, deleting information about the content in the interactive content and providing a message indicating that the available period of the coupon has expired, and when the available period of the coupon has not expired, displaying the coupon.

Also, the providing of the additional content may include, when a plurality of pieces of the additional content are received, providing first additional content, in response to a first additional content request for a first user interaction region from among a plurality of user interaction regions respectively corresponding to the plurality of pieces of additional content.

Also, the providing of the additional content may include, when there are a plurality of the user interaction regions, providing the additional content, in response to the additional content request detected by any one of the plurality of user interaction regions.

According to a third aspect, a recording medium for recording a program to be executed in a computer records a method for a terminal to provide additional content as a program to be executed in a computer.

The present invention will now be described more fully with reference to the accompanying drawings, in which exemplary embodiments of the invention are shown. The foregoing is illustrative of embodiments and is not to be construed as limiting thereof. Although a few embodiments have been described, one of ordinary skill in the art will readily appreciate that many modifications are possible in embodiments without departing from the scope of the invention. Also, parts in the drawings unrelated to the detailed description are omitted to ensure clarity of the present invention. Like reference numerals in the drawings denote like elements.

The terms used in the present invention are those general terms currently widely used in the art in consideration of functions in the present invention, but the terms may vary according to the intention of one of ordinary skill in the art, precedents, or new technology in the art. Also, some of the terms used herein may be arbitrarily chosen by the present applicant. In this case, these terms are defined in detail below. Accordingly, the specific terms used herein should be understood based on the unique meanings thereof and the whole context of the present invention.

The terms 'configured' or 'included' used herein should not be construed to include all of various elements or steps described in the specification, and should be construed to not include some of the various elements or steps or to further include additional elements or steps. Also, the terms, such as "unit" or "module", should be understood as a unit that performs at least one function or operation and may be implemented hardware, software, or a combination of hardware and software. It will be understood that, although the terms 'first', 'second', etc. may be used herein to describe various elements, these elements should not be limited by these terms. These terms are only used to distinguish one element from another.

The present invention will now be described in detail with reference to the accompanying drawings.

FIG. 1 is a view illustrating an example where, when additional content 140 is a coupon, a terminal 100 receives the additional content 140 from a server 120 by using a wireless communication device 110, according to an embodiment.

The terminal 100 is a device capable of communicating with an external device, transmitting/receiving information, and providing information to a user. The terminal 100 may capture an image. For example, the terminal may transmit an image capturing signal corresponding to the captured image to the wireless communication device 110 and may receive the additional content 140 from the server 120. The terminal 100 may be, but is not limited to, any of various digital image processing devices such as a tablet device, a smartphone, a notebook computer, or a camera.

Also, the additional content 140 refers to any type of information or content (e.g., text, a symbol, a voice, a sound, an image, or a video) that is digitally created and distributed to be used in a wired/wireless telecommunication network. For example, the additional content 140 may be content that corresponds to the image captured by the terminal 100 and is received by the terminal 100 from the server 120. Examples of the additional content 140 may be, but are not limited to, text, sound data, a coupon, a uniform resource locator (URL), map data, and a quick response (QR) code.

Also, the wireless communication device 110 refers to a device capable of transmitting/receiving digital data through a wireless communication network. Also, the wireless communication device 110 may be a device for receiving the image capturing signal from the terminal 100 within a coverage area 150 and requesting the server 120 to provide the additional content 140 to the terminal 100. Examples of a communication method used by the wireless communication device 110 may include, but are not limited to, Bluetooth, Bluetooth low energy (BLE), near-field communication (NFC), wireless local area network (WLAN) (e.g., Wi-Fi), Zigbee, infrared data association (IrDA), Wi-Fi Direct (WFD), and ultra-wideband (UWB).

Also, the server 120 refers to a device for providing a result of an operation or information requested by a client. For example, the server 120 may provide the additional content 140 to the terminal 100, based on an additional content request of the wireless communication device 110.

Also, interactive content refers to content that may interact with a user. In detail, the interactive content may provide the additional content 140 corresponding to content to the user in response to a user input. For example, when there is interactive content including an image and sound data corresponding to the image and the user requests the sound data corresponding to the image by touching a portion of the image displayed on the terminal 100, the interactive content may provide the sound data to the user. Also, when the additional content 140 is visual content, the interactive content may further include information about a position of the additional content 140 displayed on a screen.

Also, a user interaction region refers to a region that may receive an operation request signal from the user, in order to perform a preset operation. For example, the user interaction region may be a portion of the screen of the terminal 100 capable of receiving an additional content request from the user. In this case, the user interaction region may be automatically set by the terminal 100 or may be manually set based on a user input. Also, when the user interaction region is included in the interactive content, attributes (e.g., a size, a shape, a width, and the number) of the user interaction region may be changed based on a user input.

Although the terminal 100 is a smartphone, the wireless communication device 110 is a beacon receiver, and the additional content 140 is a coupon in FIG. 1 for convenience of explanation, the present embodiment is not limited thereto.

Referring to FIG. 1, when the terminal 100 captures an image, the terminal 100 transmits an image capturing signal to the wireless communication device 110. In this case, the image may be a photograph or a video. The image capturing signal may be a signal indicating that the terminal 100 has captured a predetermined image, and may include identification information of the terminal 100 and a capturing signal flag. Although the terminal 100 transmits the image capturing signal by using the advertising packet transmission standard of BLE 4.0 in FIG. 1 for convenience of explanation, the present embodiment is not limited thereto.

In this case, when the terminal 100 is located within the coverage area 150 of the wireless communication device 110, the wireless communication device 110 may receive the image capturing signal transmitted by the terminal 100. In this case, the image capturing signal may be any information indicating that an image of an object existing near the coverage area 150 of the wireless communication device 110 has been captured. Examples of the object may include a building, a place, a solid matter, an animal, and a plant. The wireless communication device 110 that receives the image capturing signal transmits identification information of the wireless communication device 110 and the identification information of the terminal 100 to the server 120, and requests the server 120 to transmit the additional content 140 corresponding to the identification information of the wireless communication device 110 to the terminal 100. The server 120 transmits the additional content 140 corresponding to the identification information of the wireless communication device 110 to the terminal 100, in response to a request of the wireless communication device 110. The identification information of the terminal 100 may be used for communication with the terminal 100 in order for the server 120 to transmit the additional content 140 to the terminal 100. The server 120 may communicate with at least one wireless communication device 110. The server 120 may determine the additional content 140 corresponding to a building, a place, a solid matter, an animal, or a plant existing near the wireless communication device 110, based on the identification information of the wireless communication device 110. To this end, the server 120 may have a database that is stored by corresponding at least one additional content 140 to the identification information of the wireless communication device 110. After the terminal 100 receives the additional content 140 from the server 120, the user interaction region may detect a signal of requesting the additional content 140 and may provide the additional content 140.

For example, referring to FIG. 1, when the wireless communication device 110 is located in a coffee shop, the user may capture an image by using the terminal 100 in a photo zone. The photo zone may be displayed in advance, in consideration of the coverage area 150 of the wireless communication device 110. When the user captures an image by using the terminal 100, the terminal 100 may automatically transmit an image capturing signal corresponding to the image to the wireless communication device 110. When the wireless communication device 110 receives the image capturing signal, the wireless communication device 110 may transmit identification information of the terminal 100 and identification information of the wireless communication device 110 to the server 120 and may request the server 120 for the additional content 140. In this case, the identification information of the wireless communication device 110 may be information about a position of the wireless communication device 110. The server 120 that is requested to provide the additional content 140 may determine that the additional content 140 to be provided to the terminal 100 is a coupon of the coffee shop, by using the identification information of the wireless communication device 110. Also, the server 120 may determine the terminal 100 to which the additional content 140 is to be provided, by using the identification information of the terminal 100. In this case, the server 120 may collect the identification information of the terminal 100 and may use the identification information of the terminal 100 to analyze a specific pattern (e.g., the number of visits and a preference) of the user.

Also, when the terminal 100 captures an image outside the coverage area 150 of the wireless communication device 110, the terminal 100 may repeatedly transmit an image capturing signal corresponding to the captured image for a predetermined period of time. Accordingly, when the terminal 100 that repeatedly transmits the image capturing signal reaches the coverage area 150 of the wireless communication device 110, the wireless communication device 110 may receive the image capturing signal.

A method of providing the additional content 140 and a method of setting a user interaction region will be explained in more detail with the following drawings.

Figure 2:
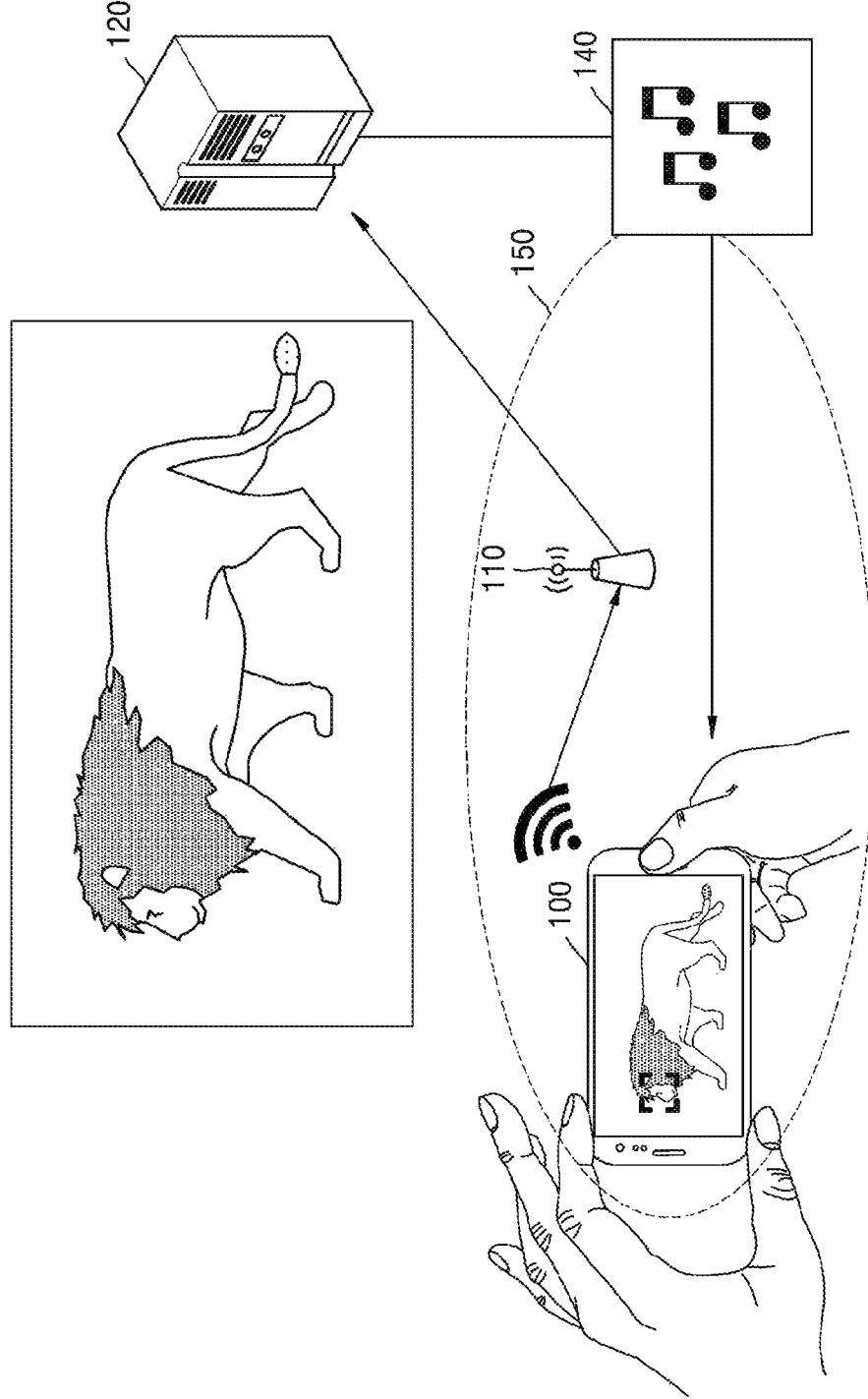
FIG. 2 is a view illustrating an example where, when the additional content is sound data, the terminal receives the additional content from the server by using the wireless communication device, according to an embodiment.

FIG. 2 is a view illustrating an example where, when the additional content 140 is sound data, the terminal 100 receives the additional content 140 from the server 120 by using the wireless communication device 110, according to an embodiment.

Referring to FIG. 2, when the wireless communication device 110 is located in a zoo, a user may capture an image by using the terminal 100 in a displayed photo zone. The terminal 100 may transmit an image capturing signal corresponding to the captured image to the wireless communication device 110, and the wireless communication device 110 may request the server 120 for the additional content 140. In this case, the server 120 may determine that the additional content 140 to be provided to the terminal 100 is sound data (e.g., the roar of a lion), based on received identification information of the wireless communication device 110. After determining the additional content 140, the server 120 may transmit the additional content 140 to the terminal 100, by using identification information of the terminal 100.

A method of providing the additional content 140 and a method of setting a user interaction region will be explained in more detail with reference to the following drawings.

Figure 3:
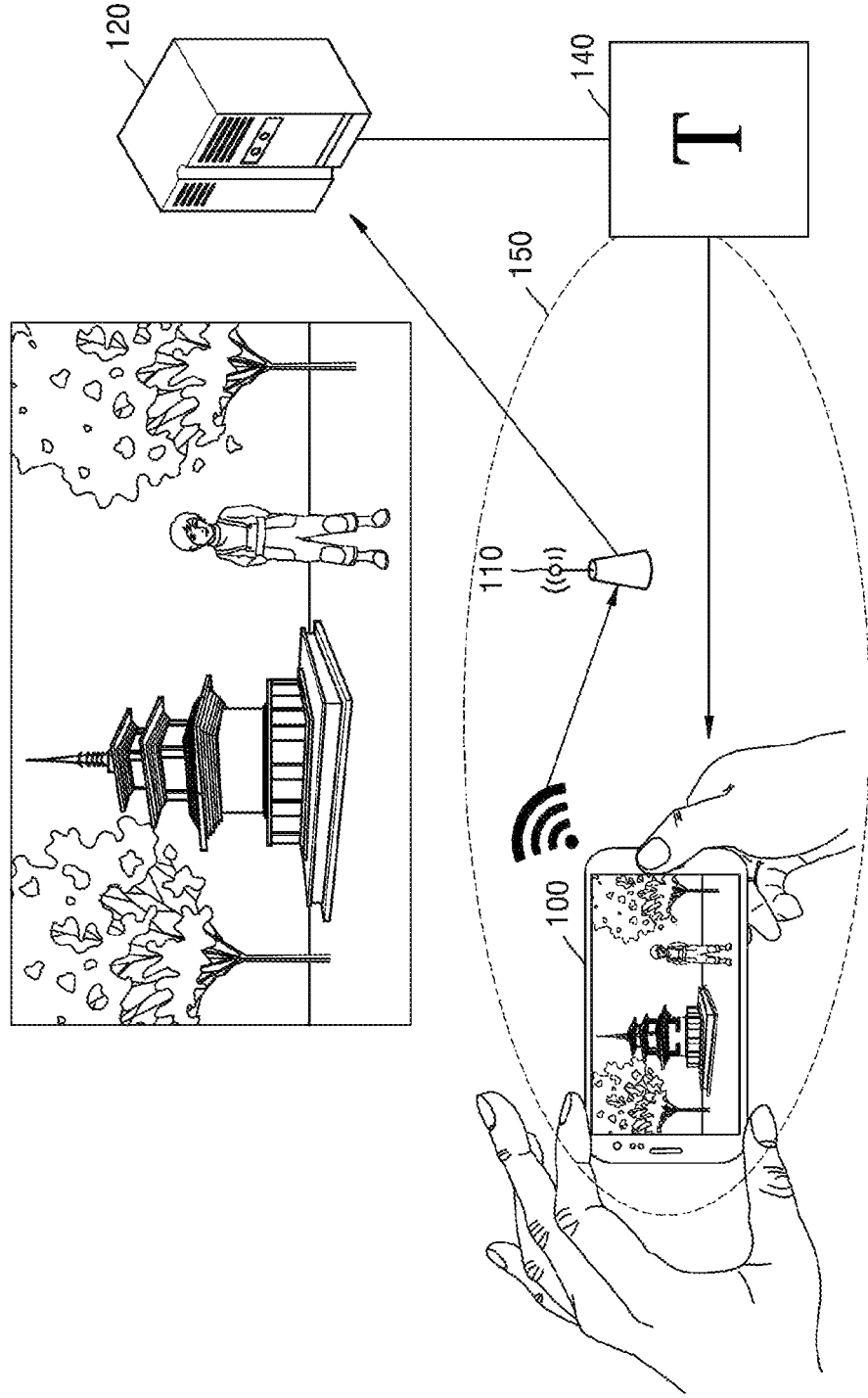
FIG. 3 is a view illustrating an example where, when the additional content is text, the terminal receives the additional content from the server by using the wireless communication device, according to an embodiment.

FIG. 3 is a view illustrating an example where, when the additional content 140 is text, the terminal 100 receives the additional content 140 from the server 120 by using the wireless communication device 110, according to an embodiment.

Referring to FIG. 3, when the wireless communication device 110 is located in a historic site (e.g., Dabo Pagoda), a user may capture an image by using the terminal 100 in a displayed photo zone. The terminal 100 may transmit an image capturing signal corresponding to the captured image to the wireless communication device 110, and the wireless communication device 110 may request the server 120 for the additional content 140. In this case, the server 120 may determine that the additional content 140 to be provided to the terminal 100 is text (e.g., description of the Dabo Pagoda), based on identification information of the wireless communication device 110. After determining the additional content 140, the server 120 may transmit the additional content 140 to the terminal 100, by using identification information of the terminal 100.

A method of providing the additional content 140 and a method of setting a user interaction region will be explained in more detail with reference to the following drawings.

Figure 4A:
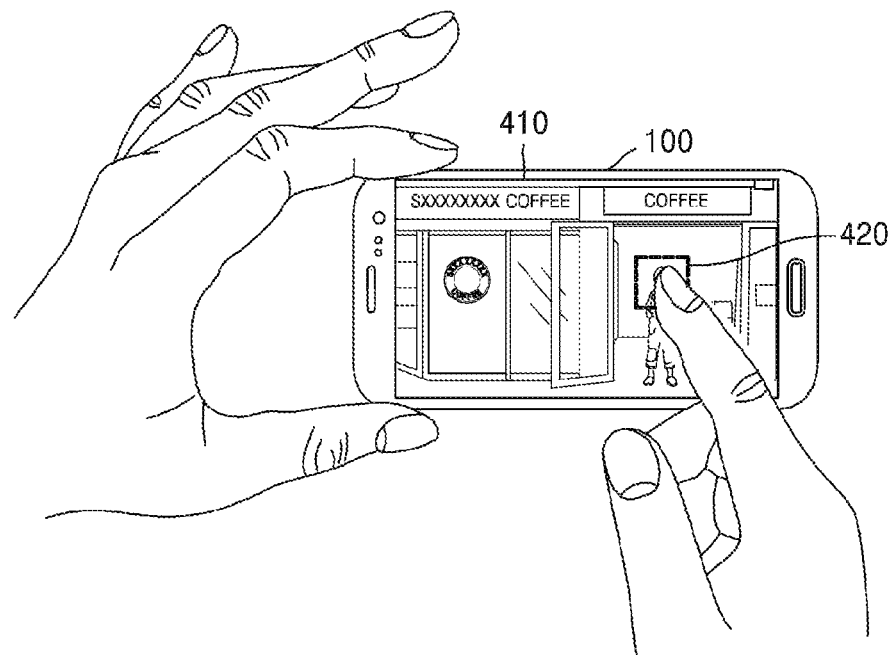
FIGS. 4A and 4B are views illustrating an example where, when the additional content is a coupon, the additional content is displayed, according to an embodiment.
Figure 4B:
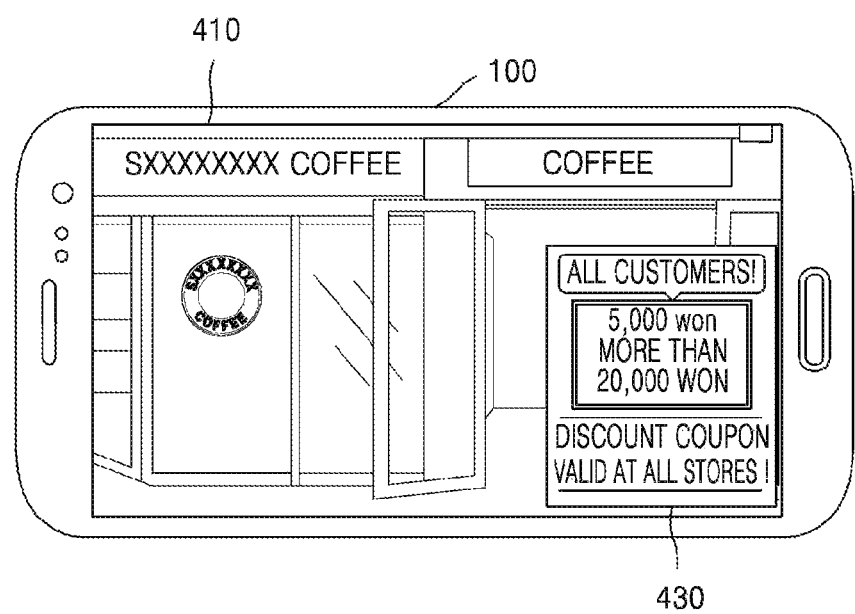

FIGS. 4A and 4B are views illustrating an example where, when the additional content 140 is a coupon, the additional content 140 is displayed, according to an embodiment.

Referring to FIGS. 4A and 4B, when the wireless communication device 110 is located in a coffee shop, the terminal 100 may receive a coupon 430 as the additional content 140 corresponding to a captured image 410 from the server 120. In this case, as shown in FIG. 4A, when the terminal 100 displays the captured image 410, a user interaction region 420 that may receive an additional content request from a user may also be displayed. In this case, when the user touches the user interaction region 420, the terminal 100 may display the coupon 430 at a specific position of the captured image 410 as shown in FIG. 4B. In this case, attributes (e.g., a position on a screen, a size, and a degree of transparency) of the coupon 430 may be changed based on a user input. Also, the displaying of the user interaction region 420 may be omitted based on initial setting of the terminal 100 or a user input.

Also, the terminal 100 may generate interactive content by linking a captured image, additional content corresponding to the captured image, and a user interaction region that may receive a signal for requesting the additional content. Also, the terminal 100 may store the generated interactive content.

For example, referring to FIGS. 4A and 4B, interactive content may be generated by linking the captured image 410, the coupon 430 that is the additional content 140 corresponding to the captured image 410, and the user interaction region 420 that may receive a signal for requesting the coupon 430.

When the additional content 140 is the coupon 430, and an available period of the coupon 430 has expired, the terminal 100 may delete information related to the coupon 430 from the interactive content and may provide a message indicating that the available period of the coupon 430 has expired. Also, when the available period of the coupon 430 has not expired, the terminal 100 may provide the coupon 430 to the user.

Also, after the terminal 100 provides the additional content 140, the terminal 100 may remove the provided additional content 140, based on a user input. For example, as shown in FIG. 4B, when the terminal 100 displays the coupon 430 that is the additional content 140 along with the captured image 410, and the user touches the user interaction region 420 once again, the coupon 430 may disappear from the screen and only the captured image 410 may be displayed. In this case, in order to delete the additional content 140, the terminal 100 may detect, but is not limited to, a signal input by the user from at least one of the captured image 410, the user interaction region 420, and the coupon 430.

A method of setting a user interaction region will be explained in more detail with reference to the following drawings.

Figure 5A:
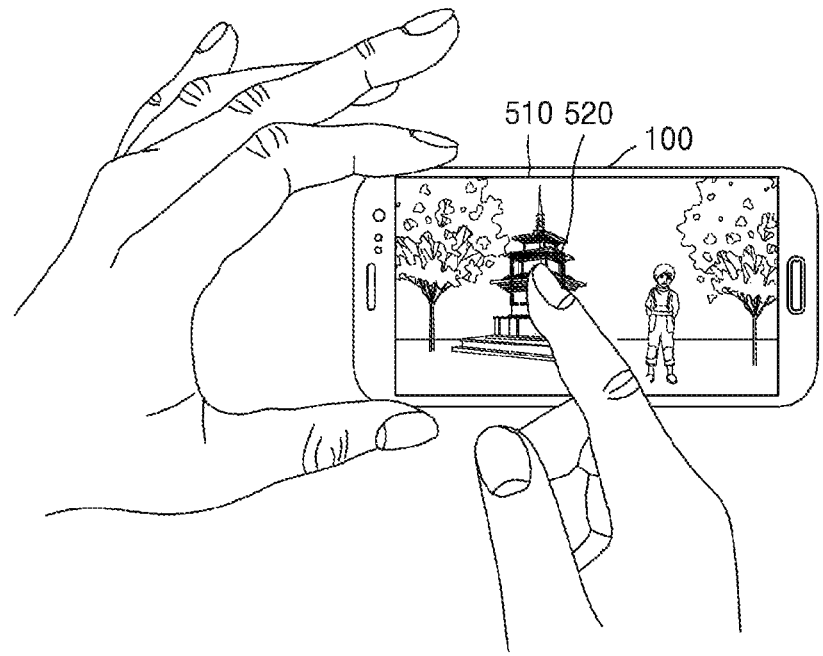
FIGS. 5A and 5B are views illustrating an example where, when the additional content is text, the additional content is displayed, according to an embodiment.
Figure 5B:
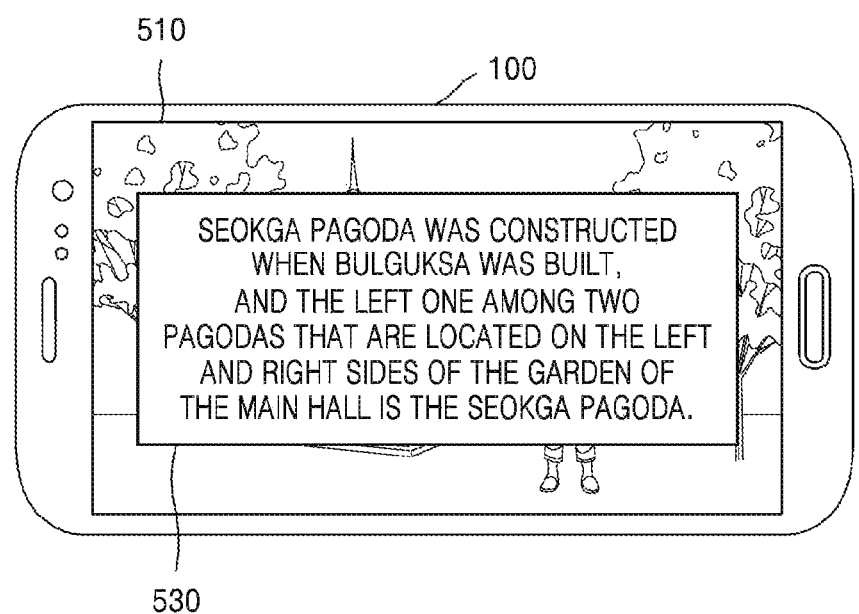

FIGS. 5A and 5B are views illustrating an example where, when the additional content 140 is text, the additional content 140 is displayed, according to an embodiment.

Referring to FIGS. 5A and 5B, when the wireless communication device 110 is located in a historic site (e.g., Dabo Pagoda), the terminal 100 may receive text (e.g., description of the Dabo Pagoda) 530 as the additional content 140 corresponding to a captured image 510 from the server 120. In this case, as shown in FIG. 5A, when the terminal 100 displays the captured image 510, a user interaction region 520 may also be displayed. If a user touches the user interaction region 520, the terminal 100 may display the text (e.g., description of the Dabo Pagoda) 530 at a specific position of the captured image 510. In this case, the text 530 may be, but is not limited to, displayed along with the captured image 510, or may be displayed instead of the captured image 510. Also, attributes (e.g., a position on a screen, a font size, and a degree of transparency) of the text 530 may be changed based on a user input.

A method of setting a user interaction region will be explained in more detail with reference to the following drawings.

Figure 6A:
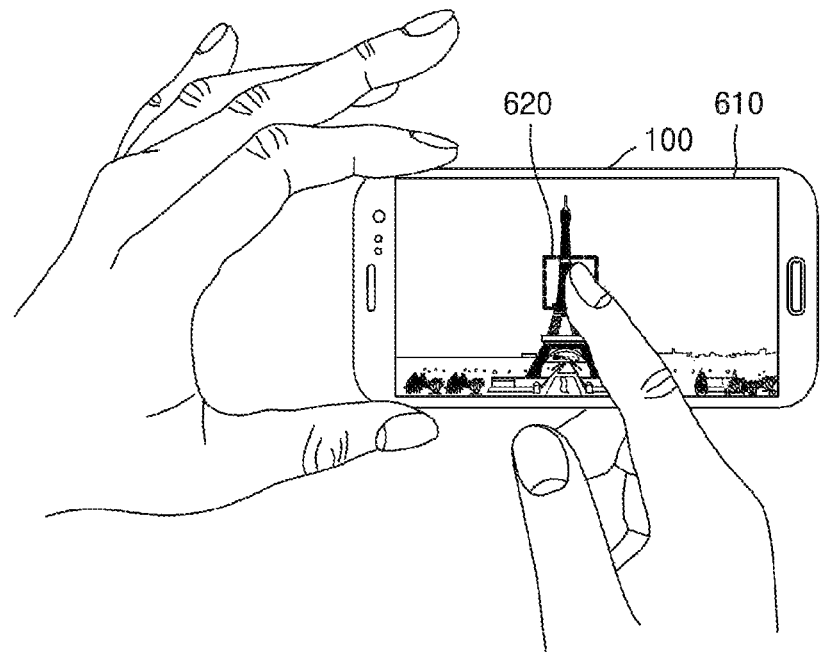
FIGS. 6A and 6B are views illustrating an example where, when the additional content is a uniform resource locator (URL), the additional content is displayed, according to an embodiment.
Figure 6B:
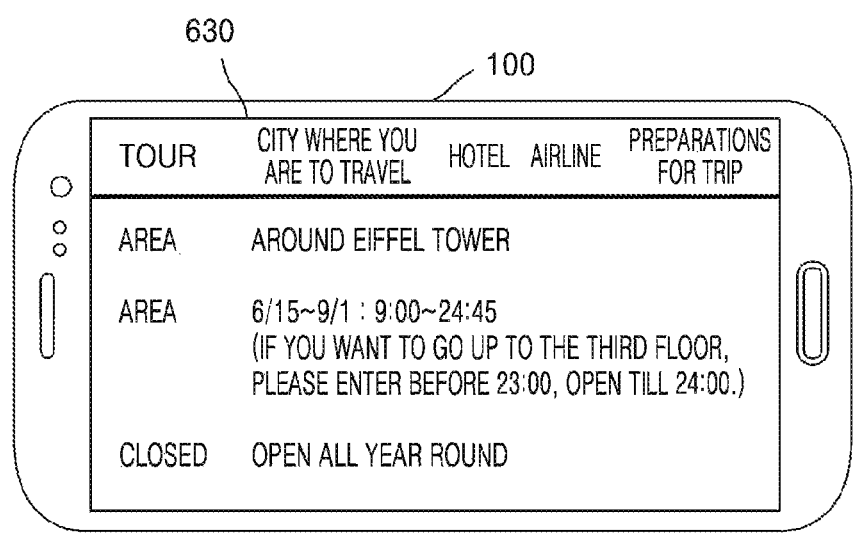

FIGS. 6A and 6B are views illustrating an example where, when additional content 140 is a URL, the additional content 140 is displayed, according to an embodiment.

Referring to FIGS. 6A and 6B, when the wireless communication device 110 is located in a tourist site (e.g., Eiffel Tower), the terminal 100 may receive a URL as the additional content 140 corresponding to a captured image 610 from the server 120. In this case, as shown in FIG. 6A, when the terminal 100 displays the captured image 610, a user interaction region 620 may also be displayed. If a user touches the user interaction region 620, the terminal 100 may display a network information resource (e.g., description of the Eiffel Tower of a travel agency website) 630 specified by the URL on a screen as shown in FIG. 6B. In this case, the network information resource 630 specified by the URL may be, but is not limited to, displayed along with the captured image 610 or may be displayed instead of the captured image 610. Also, attributes (e.g., a position on the screen, a font size, and a degree of transparency) of the network information resource 630 specified by the URL may be changed based on a user input.

A method of setting a user interaction region will be explained in more detail with reference to the following drawings.

FIGS. 7A through 7D are views illustrating an example where, when the terminal 100 receives a plurality of pieces of additional content, the terminal 100 provides the plurality of pieces of additional content to a user, according to an embodiment.

Figure 7A:
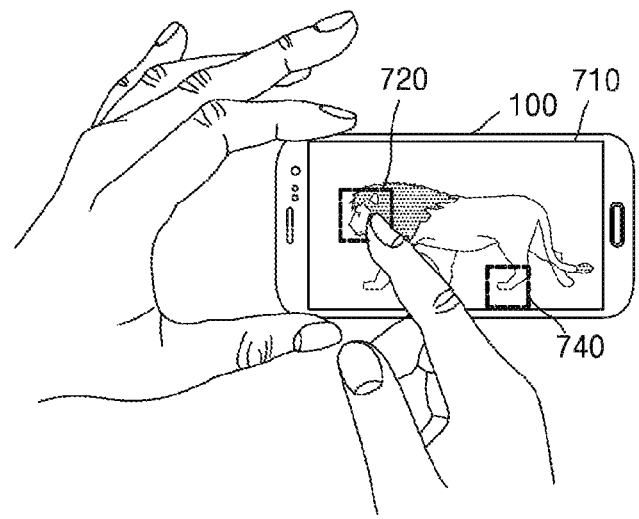
FIGS. 7A through 7D are views illustrating an example where, when the terminal receives a plurality of pieces of additional content, the terminal provides the plurality of pieces of additional content to a user, according to an embodiment.
Figure 7B:
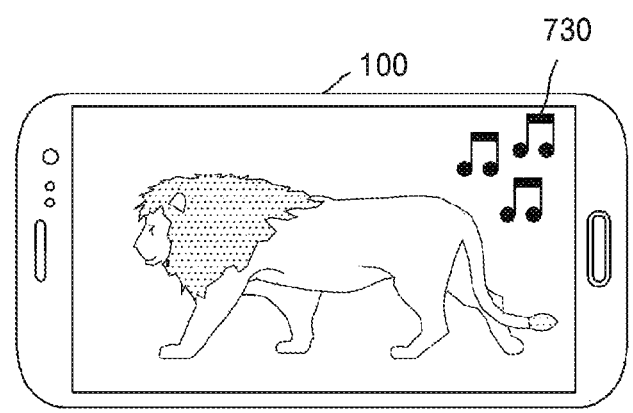
Figure 7C:
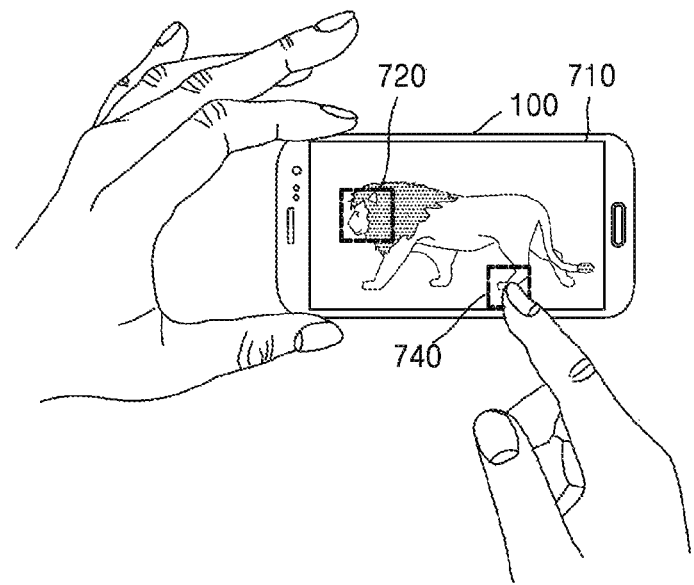
Figure 7D:
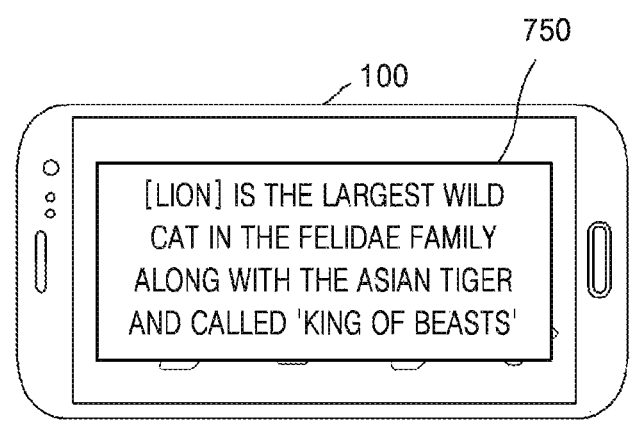

Referring to FIGS. 7A through 7D, when the wireless communication device 110 is located in a zoo, the terminal 100 may receive a plurality of pieces of additional content (e.g., the roar and description of a lion) corresponding to a captured image 710 from the server 120. In this case, as shown in FIG. 7A, when the terminal 100 displays the captured image 710, a plurality of user interaction regions (e.g., first and second user interaction regions 720 and 740) may also be displayed. In this case, the displaying of at least one of the plurality of user interaction regions (e.g., the first and second user interaction regions 720 and 740) may be omitted. However, the present embodiment is not limited thereto. If a user touches the first user interaction region 720 from among the plurality of user interaction regions, the terminal 100 may reproduce first additional content (e.g., the roar of the lion) 730 corresponding to the first user interaction region 720 as shown in FIG. 7B. Also, when the user touches the second user interaction region 740 as shown in FIG. 7C, the terminal 100 may display second additional content (e.g., the description of the lion) 750 corresponding to the second user interaction region 740 on a screen as shown in FIG. 7D.

Also, the plurality of pieces of additional content may be provided in response to a signal that is received by one user interaction region. In this case, the plurality of pieces of additional content may be sequentially provided according to a plurality of signals received by one user interaction region, or may be simultaneously provided in response to one signal. Also, when the plurality of pieces of additional content are sequentially provided, an order in which the plurality of pieces of additional content are provided may be arbitrarily set by the terminal 100, or may be set based on a user input.

A method of setting a user interaction region will be explained in more detail with reference to the following drawings.

Figure 8A:
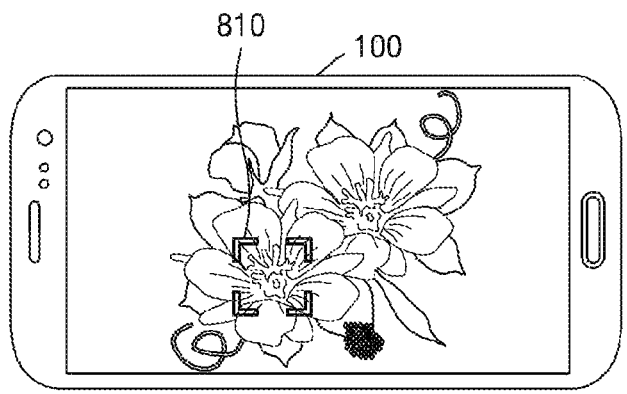
FIGS. 8A through 8C are views illustrating an example where an autofocus (AF) region, which is set during capturing of an image, is set as a user interaction region, according to an embodiment.
Figure 8B:
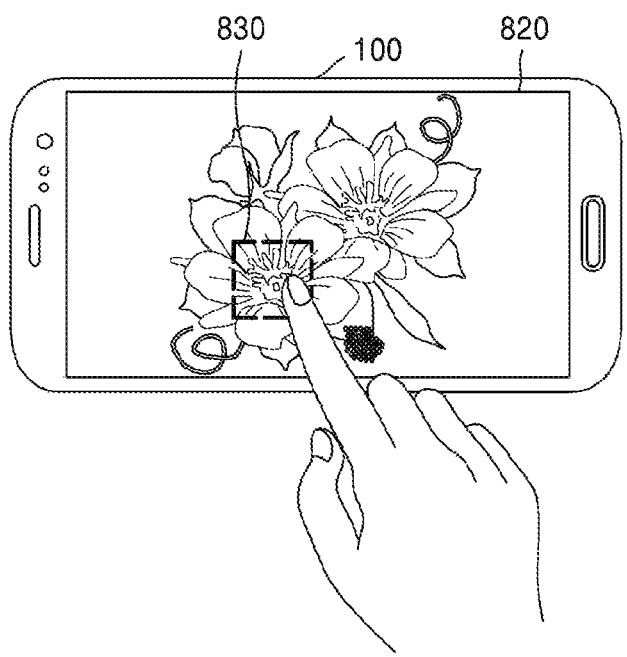
Figure 8C:
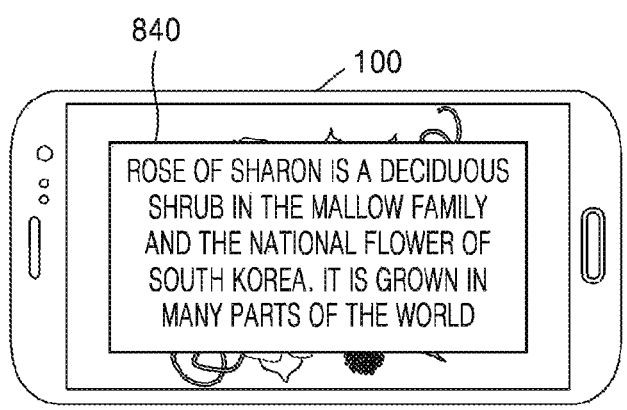

FIGS. 8A through 8C are views illustrating an example where an autofocus (AF) region, which is set during capturing of an image, is set as a user interaction region, according to an embodiment.

Referring to FIGS. 8A through 8C, in order for the terminal 100 to automatically set a user interaction region, the terminal 100 may use an AF region that is set when the terminal 100 captures an image. The AF region refers to a region where a focus is automatically set on an object whose image is to be captured. Accordingly, the terminal 100 may store an AF region that is set when an image is captured and may set a user interaction region.

For example, when a user captures an image of a rose of Sharon as shown in FIG. 8A, the terminal 100 may automatically set a focus and may display an AF region 810 on a screen. Next, as the terminal 100 transmits an image capturing signal to the wireless communication device 110 and the wireless communication device 110 requests the server 120 for the additional content 140, the terminal 100 may receive text (e.g., description of the rose of Sharon) 840 as the additional content 140 from the server 120. In this case, as shown in FIG. 8B, when the terminal 100 displays a captured image 820 on the screen, a user interaction region 830 may also be displayed. In this case, the user interaction region 830 may be the same as the AF region 810 set when the image of the rose of Sharon is captured. When the user touches the user interaction region 830 displayed on the screen, the terminal 100 may display the text (e.g., the description of the rose of Sharon) 840 at a specific position of the captured image 820. In this case, the text 840 may be, but is not limited to, displayed along with the captured image 820 or may be displayed instead of the captured image 820.

Also, the user interaction region 830 may be set in advance to a predetermined portion of the screen, based on a user input, before an image corresponding to the additional content 140 is captured. In this case, the user may set attributes (e.g., a size, a shape, and the number) of the user interaction region 830.

Also, the user interaction region 830 may be the entire screen. In this case, the terminal 100 may provide the additional content 140, based on a signal received from all regions of a captured image.

Figure 9A:
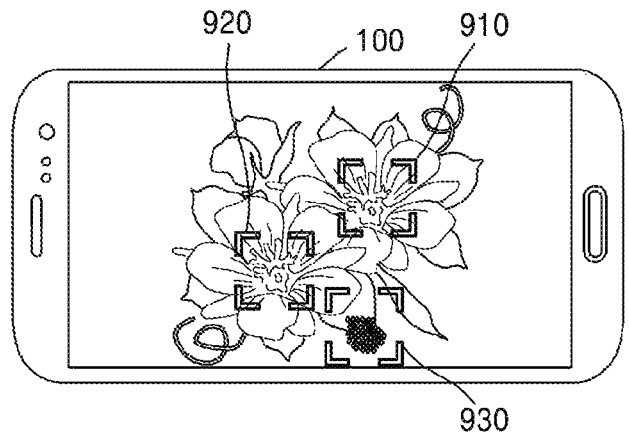
FIGS. 9A through 9C are views illustrating an example where, when a plurality of AF regions are set during capturing of an image, additional content is provided, according to an embodiment.
Figure 9B:
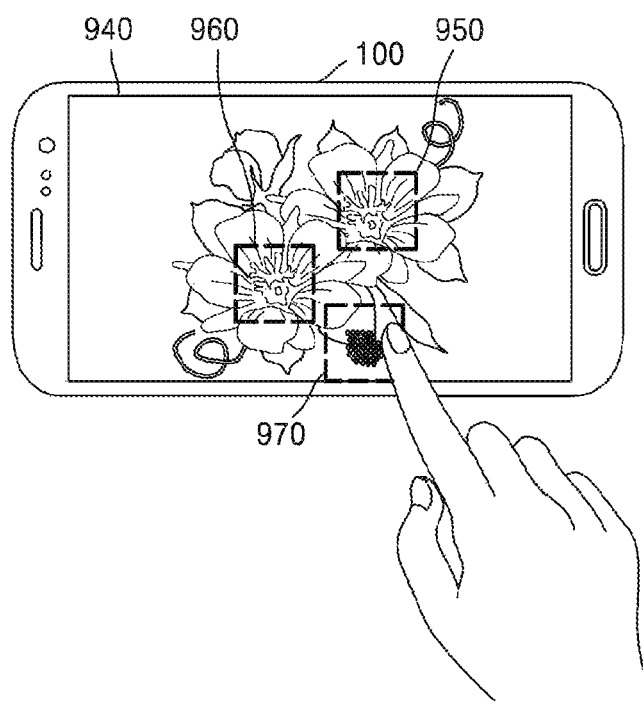
Figure 9C:
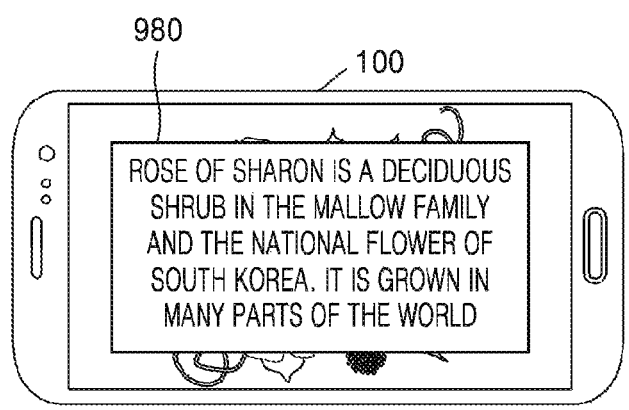

FIGS. 9A through 9C are views illustrating an example where, when a plurality of AF regions are set during capturing of an image, additional content is provided, according to an embodiment.

The terminal 100 may set an AF region that is defined when an image is captured as a user interaction region. In this case, when there are a plurality of AF regions, a plurality of user interaction regions may be set.

For example, as shown in FIG. 9A, when a user captures an image of a rose of Sharon, the terminal 100 may automatically set focuses and may display a plurality of AF regions 910, 920, and 930 on a screen. Next, when the server 120 transmits the additional content 140 to the terminal 100 in response to a request of the wireless communication device 110, the terminal 100 may receive text (e.g., description of the rose of Sharon) 980 as the additional content 140 corresponding to a captured image 940. In this case, as shown in FIG. 9B, when the terminal 100 displays the captured image 940 on the screen, a plurality of user interaction regions 950, 960, and 970 may also be displayed. In this case, the user interaction regions 950, 960, and 970 may be respectively the same as the AF regions 910, 920, and 930 that are set when the rose of Sharon is captured. If the user touches one (e.g., the user interaction region 970) from among the plurality of user interaction regions 950, 960, and 970 displayed on the screen, the terminal 100 may display the text (the description of the rose of Sharon) 980 at a specific position of the captured image 940. In this case, the text 980 may be, but is not limited to, displayed along with the captured image 940 or may be displayed instead of the captured image 940.

Figure 10A:
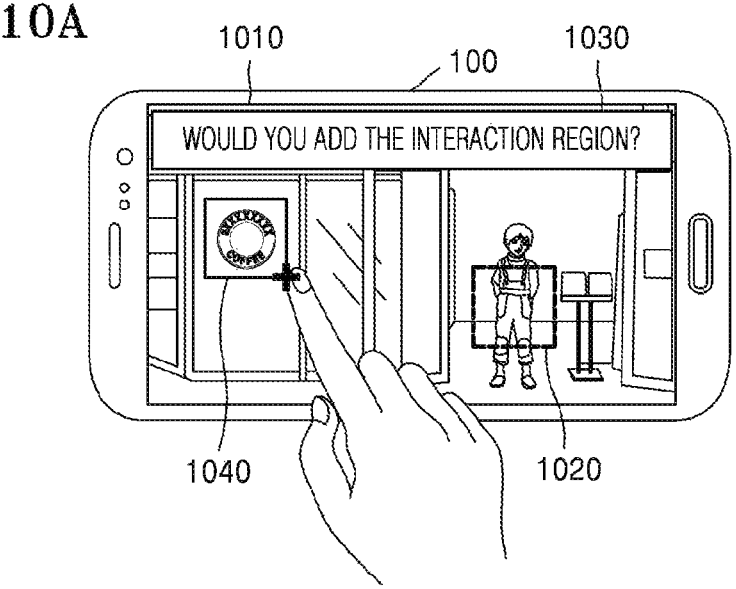
FIGS. 10A through 10C are views illustrating an example where a user interaction region included in interactive content is changed, according to an embodiment.
Figure 10B:
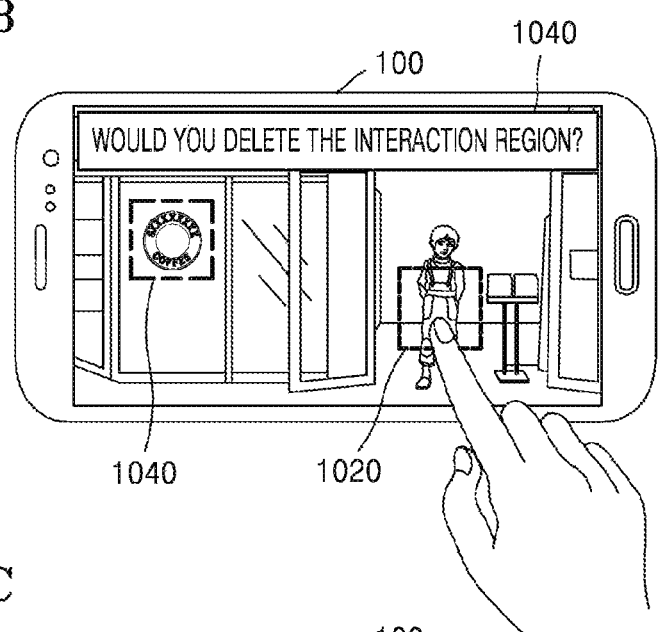
Figure 10C:
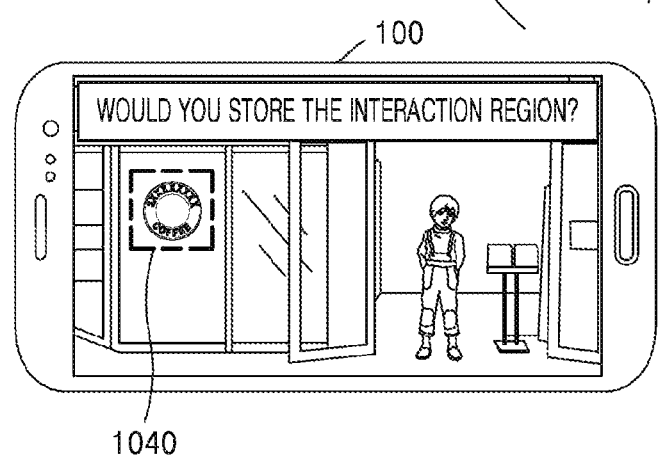

FIGS. 10A through 10C are views illustrating an example where a user interaction region included in interactive content is changed, according to an embodiment.

The user interaction region may be set to a predetermined portion of a screen of the terminal 100 before an image corresponding to the additional content 140 is captured, or after the image is captured, to a predetermined portion of the captured image.

Referring to FIGS. 10A through 10C, the terminal 100 may generate interactive content so that the interactive content includes an image 1010 captured in a photo zone of a coffee shop, the coupon 430 that corresponds to the captured image 1010 and is received from the server 120, and a user interaction region 1040. Also, the terminal 100 may store the generated interactive content. In this case, a user may change attributes (e.g., a size, a shape, and the number) of the user interaction region included in the interactive content. Also, the user may change attributes (e.g., a position on a screen, a size, and a degree of transparency) of the additional content 140 included in the interactive content, and may delete the additional content 140 that is unnecessary.

Referring to FIG. 10A, the terminal 100 may display, on the screen, a user interaction region 1020 included in the interactive content along with the captured image 1010. In this case, the user may newly add the user interaction region 1040. Also, referring to FIG. 10B, the user may select and delete one region (e.g., the user interaction region 1020) from among the plurality of user interaction regions 1020 and 1040. When the user interaction region 1020 is completely deleted, the terminal 100 may store changed interactive content including the remaining user interaction region 1040 as shown in FIG. 10C.

Figure 11:
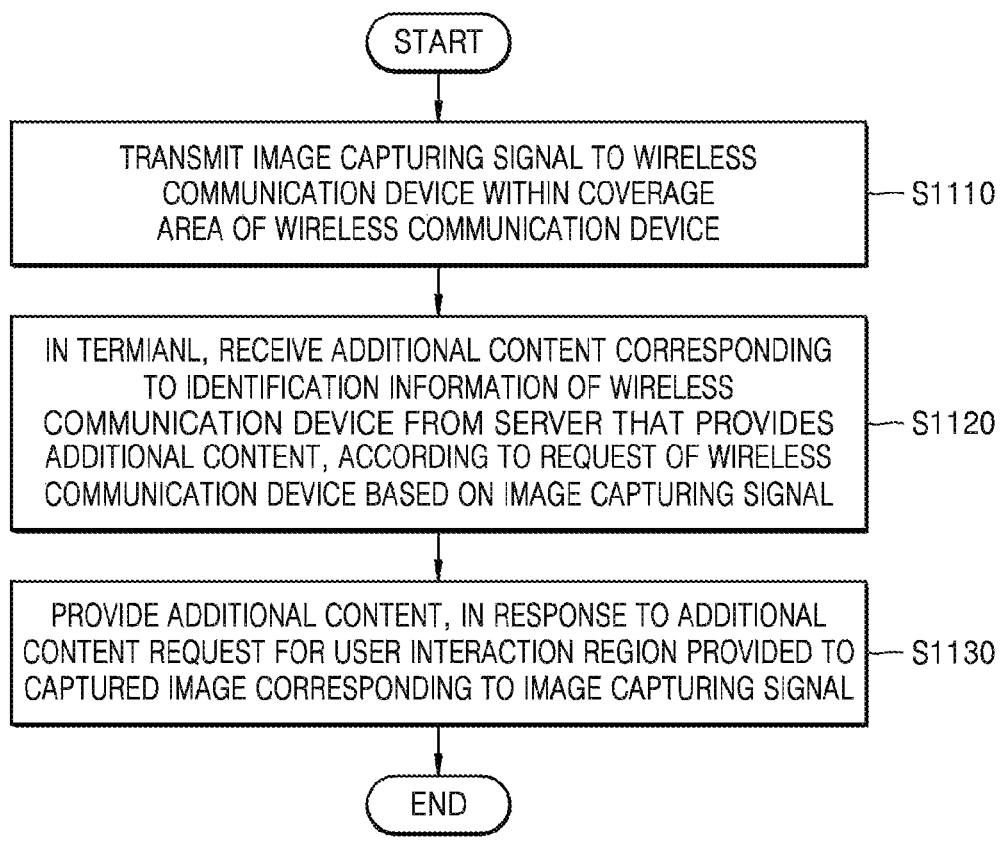
FIG. 11 is a flowchart of a method by which the terminal provides the additional content by using the wireless communication device, according to an embodiment.

FIG. 11 is a flowchart of a method by which the terminal 100 provides the additional content 140 by using the wireless communication device 110, according to an embodiment.

In operation S1110, the terminal 100 may transmit an image capturing signal to the wireless communication device 110 within the coverage area 150 of the wireless communication device 110. In this case, an image may include a photograph or a video. Also, the image capturing signal may be any type of information indicating that the terminal 100 has captured the image, and may include identification information of the terminal 100 and a capturing signal flag.

Also, when the terminal 100 captures an image outside the coverage area 150 of the wireless communication device 110, the terminal 100 may repeatedly transmit the image capturing signal corresponding to the captured image for a predetermined period of time.

In operation S1120, the terminal 100 may receive the additional content 140 from the server 120. In this case, the server 120 determines the additional content 140 based on identification information of the wireless communication device 110 received from the wireless communication device 110.

In operation S1130, the terminal 100 may provide the additional content 140, in response to an additional content request for a user interaction region provided to the captured image corresponding to the image capturing signal.

In this case, the user interaction region may be automatically set by the terminal 100, or may be manually set based on a user input. Also, the terminal 100 may use an AF region that is set during the capturing of the image, in order to automatically set the user interaction region.

Also, the user interaction region may be set before the image corresponding to the additional content 140 is captured, or may be set after the image corresponding to the additional content 140 is captured.

Also, when the additional content 140 is displayed on a screen, the additional content 140 may be displayed along with the captured image or may be displayed instead of the captured image. Also, attributes (e.g., a size, a degree of transparency, and a position on the screen) of the additional content 140 may be changed based on a user input.

Figure 12:
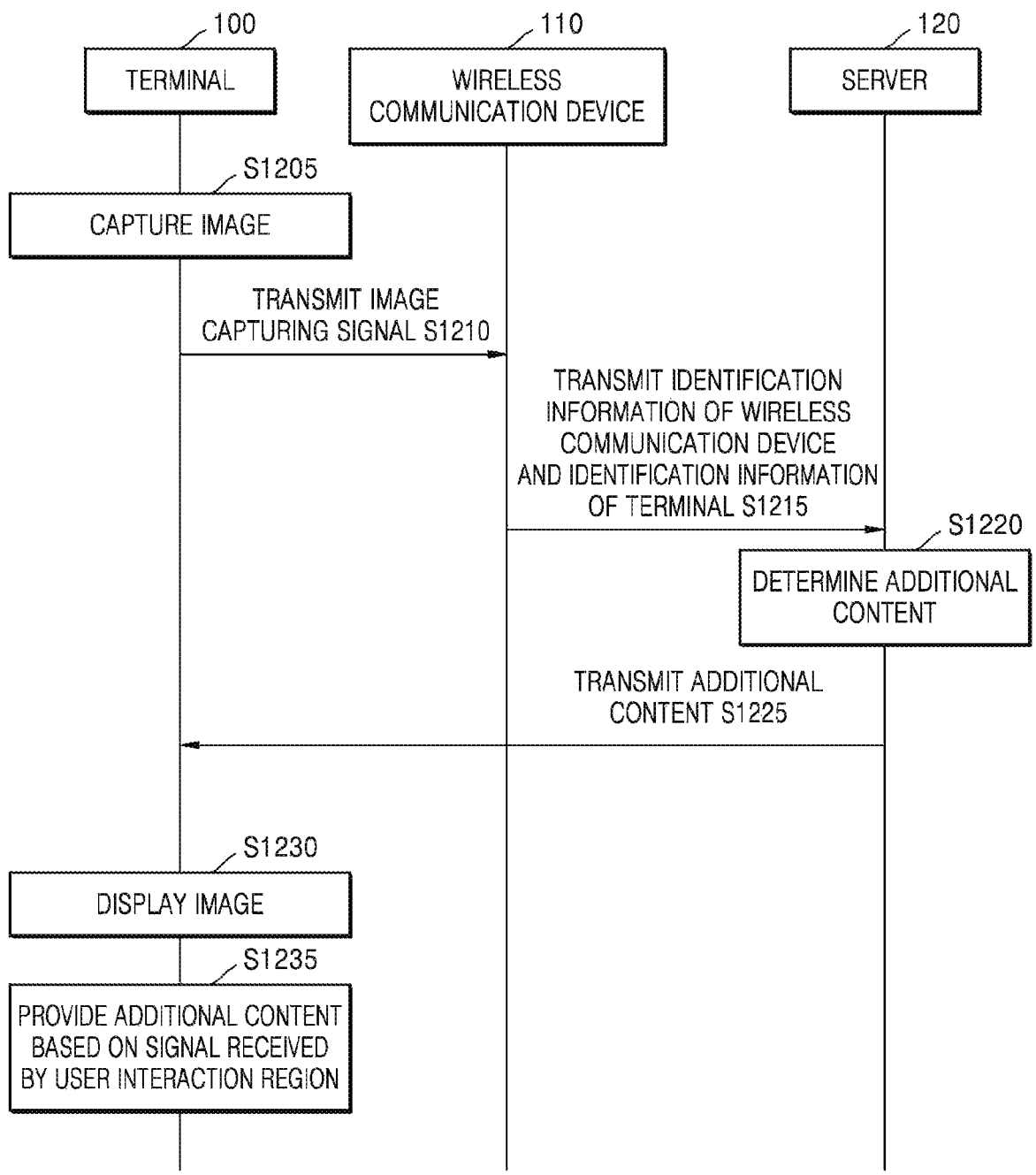
FIG. 12 is a flowchart for explaining a method by which the terminal provides the additional content by using the wireless communication device, according to an embodiment.

FIG. 12 is a flowchart for explaining a method by which the terminal 100 provides the additional content 140 by using the wireless communication device 110, according to an embodiment.

In operation 51205, the terminal 100 may capture an image. In this case, the image may be a photograph or a video. In this case, the terminal 100 may automatically set a focus and may store an AF region.

In operation S1210, the terminal 100 may transmit an image capturing signal to the wireless communication device 110. For example, the terminal 100 may transmit the image capturing signal by using the advertising packet transmission standard of BLE 4.0 to the wireless communication device 110. In this case, the image capturing signal transmitted by the terminal 100 may include identification information of the terminal 100 and a capturing signal flag.

In operation S1215, when the terminal 100 transmits the image capturing signal within the coverage area 150 of the wireless communication device 110, the wireless communication device 110 may receive the image capturing signal. When the wireless communication device 110 receives the image capturing signal, the wireless communication device 110 may transmit identification information of the wireless communication device 110 and the identification information of the terminal 100 to the server 120 and may request the server 120 for the additional content 140.

In operation S1220, when the server 120 receives the identification information of the wireless communication device 110 and the identification information of the terminal 100 from the wireless communication device 110, the server 120 may determine the additional content 140 to be provided to the terminal 100 by using the identification information of the wireless communication device 110. Also, the server 120 may collect the identification information of the terminal 100 received from the wireless communication device 110, and may use the identification information of the terminal 100 to analyze a specific pattern (e.g., the number of visits or a preference) of a user.

In operation S1225, the server 120 may transmit the additional content 140 to the terminal 100. In this case, the sever 120 may designate the terminal 100 that is to receive the additional content 140, by using the identification information of the terminal 100 received from the wireless communication device 110.

In operation 51230, the terminal 100 may display the captured image on a screen. In this case, a user interaction region may be displayed along with the captured image. The displaying of the user interaction region may be omitted based on initial setting of the terminal 10 or a user input.

In operation S1235, the terminal 100 may provide the additional content 140, in response to an additional content request received by the user interaction region. Operation S1235 corresponds to operation S1130 of FIG. 11, and thus a detailed explanation thereof will not be given.

Figure 13:
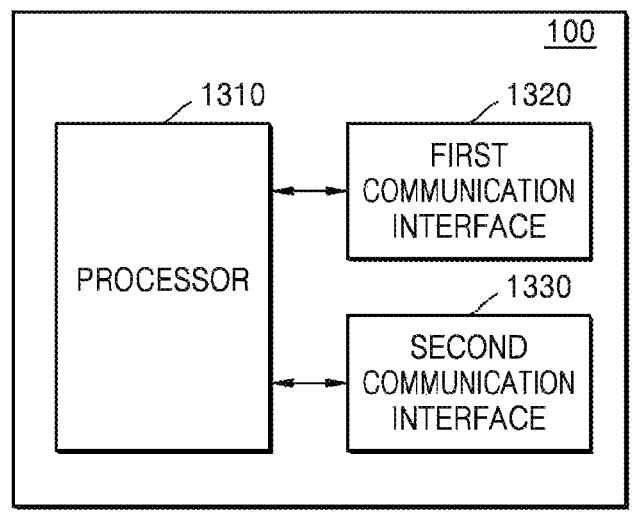
FIG. 13 is a diagram illustrating a hardware configuration of the terminal, according to an embodiment.

FIG. 13 is a diagram illustrating a hardware configuration of the terminal 100, according to an embodiment.

Referring to FIG. 13, the terminal 100 may include a processor 1310, a first communication interface 1320, and a second communication interface 1330. However, it will be understood by one of ordinary skill in the art that other general-purpose hardware elements in addition to the elements illustrated in FIG. 13 may be included in the terminal 100.

The first communication interface 1320 is a hardware element for performing wireless communication between the terminal 100 and the wireless communication device 110. The first communication interface 1320 may transmit an image capturing signal within the coverage area 150 of the wireless communication device 110. The first communication interface 1320 may be, but is not limited to, connected to the wireless communication device 110 through Bluetooth-based short-range wireless communication, or may communicate with the wireless communication device 110 through a WLAN or the like.

The second communication interface 1330 is a hardware element for transmitting/receiving data between the terminal 100 and the server 120. The second communication interface 1330 may receive the additional content 140 corresponding to a captured image from the server 120. The second communication interface 1330 may be, but is not limited thereto, connected to the server 120 through an access point (AP), or may be directly connected to the server 120 by using WFD or the like.

The processor 1310 is a hardware element for controlling operations of all elements included in the terminal 100. The processor 1310 may provide the additional content 140, in response to an additional content request for a user interaction region provided to the captured image. Also, the processor 1310 may generate and store interactive content including the captured image, the additional content 140 corresponding to the captured image, and the user interaction region that receives the additional content request.

Figure 14:
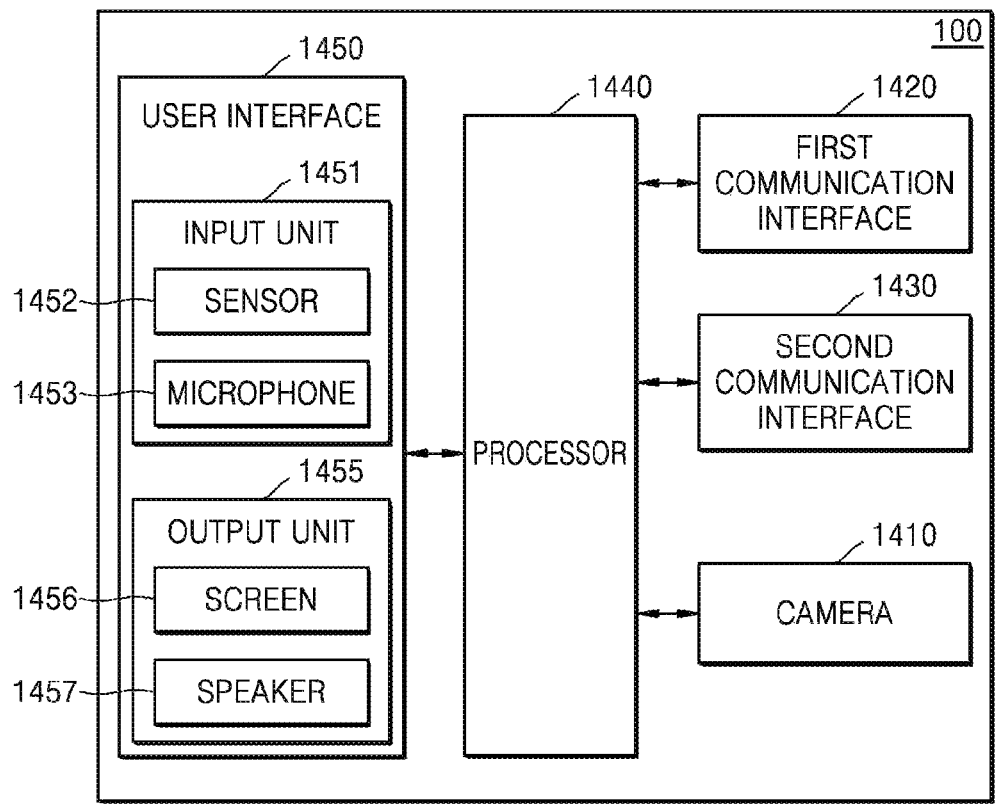
FIG. 14 is a diagram illustrating a hardware configuration of the terminal, according to an embodiment.

FIG. 14 is a diagram illustrating a hardware configuration of the terminal 100, according to an embodiment.

Referring to FIG. 14, the terminal 100 may include a camera 1410, a first communication interface 1420, a second communication interface 1430, a processor 1440, and a user interface 1450. However, it will be understood by one of ordinary skill in the art that other general-purpose hardware elements in addition to the elements illustrated in FIG. 14 may be included in the terminal 100.

The camera 1410 is a hardware element for capturing an image. The camera 1410 captures an image and transmits the captured image to the processor 1440. Also, the camera 1410 may capture an image by automatically setting a focus, and may transmit an AF region that is set during the capturing of the image to the processor 1440.

The user interface 1450 is a hardware element for obtaining a signal for controlling the terminal 100 from a user and providing data and content to the user. The user interface 1450 may include an input unit 1451 and an output unit 1455.

The input unit 1451 may receive a user input for selecting various pieces of content or options displayed on the output unit 1455. Also, the input unit 1451 may receive a signal for capturing an image and a signal for requesting the additional content 140 from the user. For example, the input unit may include, but is not limited to, a sensor 1452 and a microphone 1453, and may include a keypad, a dome switch, a touchpad (e.g., a capacitive type, a pressure resistive type, an infrared beam sensing type, or a piezoelectric effect type), a jog wheel, or a jog switch.

The output unit 1455 includes a screen 1456 and a speaker 1457. Also, the output unit 1455 may display and output information processed by the terminal 100. For example, the output unit 1455 may display the image captured by the camera 1410, and may output the additional content 140 corresponding to the captured image and a user interaction region that may receive an additional content request.

The screen 1456 included in the output unit 1455 may display not only the captured image but also a graphical user interface (GUI) screen for controlling the terminal 100 or visual content from among the additional content 140 received by the terminal 100. Also, the screen 1456 may display the user interaction region that may receive a user input that requests the additional content 140. For example, the screen 1456 may be any of various displays such as a liquid crystal display (LCD), a thin-film transistor-liquid crystal display (TFT-LCD), an organic light-emitting diode (OLED), a flexible display, a three-dimensional (3D) display, or an electrophoretic display.

The speaker 1457 included in the output unit 1450 may provide auditory content from among the additional content 140 to the user, based on a signal received by the user interaction region.

The screen 1456 of the output unit 1455 and the sensor 1452 of the input unit 1451 of the terminal 100 may be partially integrated into a touchscreen that is generally used in a smartphone, a tablet device, etc.

In FIG. 14, the first communication interface 1420 corresponds to the first communication interface 1320 of FIG. 13. Also, the second communication interface 1430 corresponds to the second communication interface 1330 of FIG. 13. The processor 1440 corresponds to the processor 1310 of FIG. 13. Accordingly, a detailed explanation of the first communication interface 1420, the second communication interface 1430, and the processor 1440 will not be given.

The present disclosure may be embodied as a recording medium including instructions that may be executed in computers, e.g., a program module executed in computers. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

The scope of the present invention is defined not by the detailed description of the inventive concept but by the appended claims, and all differences or modifications derived from the meaning, scope, and equivalent of the claims within the scope will be construed as being included in the present invention.

The invention claimed is:

1. A terminal for providing additional content, the terminal comprising:
    a first communication interface configured to transmit an image capturing signal to a wireless communication device within a coverage area of the wireless communication device;
    a second communication interface configured to receive the additional content corresponding to identification information of the wireless communication device from a server based on identification information of the terminal, wherein the additional content is provided by the server which received a request from the wireless communication device receiving the image capturing signal, the request of the wireless communication device comprising the identification information of the terminal and the identification information of the wireless communication device; and
    a processor configured to provide the additional content, in response to an additional content request detected in at least one user interaction region, the at least one user interaction region being provided in a captured image corresponding to the image capturing signal,
    wherein the processor is further configured to provide a different type of additional content for each of the at least one user interaction region based on a user touch input in the at least one user interaction region.

2. The terminal of claim 1, further comprising a user interface configured to display the captured image and the user interaction region and detect a signal requesting the additional content, wherein the signal requesting the additional content is detected in the user interaction region.

3. The terminal of claim 1, further comprising a camera configured to capture an image,
    wherein the processor is further configured to set the user interaction region to an autofocus (AF) region set during the capturing of the image.

4. The terminal of claim 1, wherein the processor is further configured to generate interactive content for providing the additional content, by linking the captured image, the additional content corresponding to the captured image, and the user interaction region in which a signal requesting the additional content is detected.

5. The terminal of claim 4, wherein the processor is further configured to change a position of the user interaction region in the captured image included in the generated interactive content based on a user input to a change position and to update the position of the user interaction region included in the generated interactive content to the change position.

6. The terminal of claim 1, wherein the processor is further configured to, when a plurality of pieces of additional content are received, provide first additional content, in response to a first additional content request for a first user interaction region from among a plurality of user interaction regions respectively corresponding to the plurality of pieces of additional content.

7. The terminal of claim 1, wherein the processor is further configured to, when there are a plurality of user interaction regions, provide the additional content, in response to the additional content request detected by any one of the plurality of user interaction regions.

8. The terminal of claim 1, wherein the processor is further configured to, after the terminal provides the additional content, delete the additional content, based on a user input detected by the user interaction region.

9. A method by which a terminal provides additional content, the method comprising:
    transmitting an image capturing signal to a wireless communication device within a coverage area of the wireless communication device;
    receiving the additional content corresponding to identification information of the wireless communication device from a server based on identification information of the terminal, wherein the additional content is provided by the server which received a request from the wireless communication device receiving the image capturing signal, the request of the wireless communication device comprising the identification information of the terminal and the identification information of the wireless communication device; and
    providing the additional content, in response to an additional content request detected in at least one user interaction region, the at least one user interaction region being provided in a captured image corresponding to the image capturing signal,
    wherein the providing of the additional content comprises providing a different type of additional content for each of the at least one user interaction region based on a user touch input in the at least one user interaction region.

10. The method of claim 9, wherein the user interaction region is an autofocus (AF) region set during the capturing of the image.

11. The method of claim 9, further comprising generating interactive content for providing the additional content, by linking the captured image, the additional content corresponding to the captured image, and the user interaction region in which the signal requesting the additional content is detected,
    wherein the providing of the additional content comprises providing the additional content by using the generated interactive content.

12. The method of claim 11, further comprising changing a position of the user interaction region in the captured image included in the generated interactive content based on a user input to a change position; and updating the position of the user interaction region included in the generated interactive content to the change position.

13. The method of claim 9, wherein the providing of the additional content comprises, when a plurality of pieces of additional content are received, providing first additional content, in response to a first additional content request for a first user interaction region from among a plurality of user interaction regions respectively corresponding to the plurality of pieces of additional content.

14. The method of claim 9, wherein the providing of the additional content comprises, when there are a plurality of user interaction regions, providing the additional content, in response to the additional content request detected by any one of the plurality of user interaction regions.

15. The method of claim 9, further comprising, after the terminal provides the additional content, deleting the additional content, based on a user input, detected by the user interaction region.

\* \* \* \* \*